United States Patent [19]

Delon et al.

[11] Patent Number: 4,604,622

[45] Date of Patent: Aug. 5, 1986

[54] PROXIMITY RADAR

[75] Inventors: Patrice C. G. Delon, Neuilly; Gerard D. Fourreaux, Chatou; Michel J. R. Nicolas, Paris; Bruno R. Sebilet, Suresnes, all of France

[73] Assignee: Societe Nationale d'Etude et de Construction de Moteurs d'Aviation S.N.E.C.M.A., Paris, France

[21] Appl. No.: 498,162

[22] Filed: May 25, 1983

[30] Foreign Application Priority Data

Jun. 28, 1982 [FR] France ............................... 82 11268

[51] Int. Cl.$^4$ ............................................. G01S 13/32
[52] U.S. Cl. ............................... 343/5 PD; 343/7 PF; 343/17.2 R
[58] Field of Search .............. 343/17.5, 6.5 LC, 7 PF, 343/13 R, 7.5, 12 R, 14, 12 A, 17.1 PF, 17.2 R, 17.2 PC

[56] References Cited

U.S. PATENT DOCUMENTS

| | | | |
|---|---|---|---|
| 2,699,544 | 1/1955 | Hasbrook | 343/12 R |
| 2,768,372 | 10/1956 | Green | 343/13 R |
| 3,680,101 | 7/1972 | Granqvist | 343/14 |
| 3,774,206 | 11/1973 | Rauch | 343/12 A X |
| 3,877,377 | 4/1975 | Rabinow | 343/7 PF |
| 4,014,021 | 3/1977 | Fournier et al. | 343/7.5 |
| 4,019,185 | 4/1977 | Morgan | 343/7 PF |
| 4,042,925 | 8/1977 | Albanese et al. | 343/14 |
| 4,115,772 | 9/1978 | Valdes | 343/14 X |
| 4,236,157 | 11/1980 | Goss et al. | |
| 4,297,702 | 10/1981 | Carnes | |

Primary Examiner—Thomas H. Tarcza
Assistant Examiner—B. E. Gregory
Attorney, Agent, or Firm—Oblon, Fisher, Spivak, McClelland & Maier

[57] ABSTRACT

A proximity radar is described in which a signal phase modulated in accordance with a pseudorandom sequence is transmitted from an antenna, and a return signal reflected from a target is received by this antenna. The return signal is correlated with a signal identical to the transmitted signal but delayed by a selected time interval. The delay imposed on the transmitted signal as fed to the correlator is alternately given the two values n.t and n'.t where n' is less than n and the time interval n.t corresponds to the time taken by the signal to travel to and return from the target when the radar is at a predetermined distance from the target, which distance is to be detected. The correlator output is fed through an amplifier circuit including an automatic gain control circuit when the delay is n'.t and the automatic gain control circuit is inoperative when the delay is n.t.

7 Claims, 2 Drawing Figures

PROXIMITY RADAR

BACKGROUND OF THE INVENTION

1. Technical Field

The present invention relates to proximity radars and more specifically, to a radar which is intended to detect when it is located a predetermined distance from a target.

2. Prior Art

It is already known, in such an installation, to transmit a signal which is phase modulated in accordance with a pseudorandom sequence of logic signals. The return signal, which has been reflected from the target is then correlated with the transmitted signal, which has been delayed by a fixed time, that corresponds to the time for the signal to travel to and return from the target when the radar is at the required predetermined distance. Correlation is a well-known operation and consists of multiplying together the signals to be correlated and filtering the resultant signal in order to integrate it. The correlation signal thus produced is generally a very low voltage, except when the delay introduced corresponds precisely to the time taken by the transmitted signal to travel to and return from the target. The variation in the voltage as a function of the difference between the fixed delay and actual delay has the form of an isosceles triangle of which the apex corresponds to the maximum voltage and corresponds to the delays being equal and thus the radar being positioned at the required predetermined distance from the target.

When the voltage level of the correlation signal exceeds a predetermined threshold, a logic circuit is provided which is adapted to deliver a signal indicating that the radar is approaching the predetermined distance from the target.

If this type of proximity radar is being carried by a device which is moving through a region which is subject to substantial electromagnetic disturbance, then parasitic voltages may be produced which are in excess of the predetermined threshold and which cause false indications of the position of the radar to be produced.

It is therefore an object of the present invention to provide a proximity radar which is adapted to overcome the abovementioned disadvantage.

SUMMARY OF THE INVENTION

The present invention provides a proximity radar for detecting when the radar is at a predetermined distance from a target, said radar including means for transmitting towards the target a signal phase modulated in accordance with a pseudorandom sequence of logic bits produced at a control frequency, means for receiving the transmitted signal after reflection from said target, time delay means for producing an output of a signal corresponding to the transmitted signal which is delayed by a selected time interval, means for correlating the received signal with the output signal of the time delay means, an amplifier for amplifying the output of said correlating means, means for alternately setting said selected time interval to times corresponding to the duration of n bits and n' bits of said pseudorandom sequence, where n' is less than n and the duration of n bits corresponds to the time taken for the signal to travel twice said predetermined distance, and an automatic gain control circuit for controlling said amplifier when said time interval corresponds to n' bits, said automatic gain control circuit being inoperative when said time interval corresponds to n bits.

DESCRIPTION OF A PREFERRED EMBODIMENT

Figure 1:
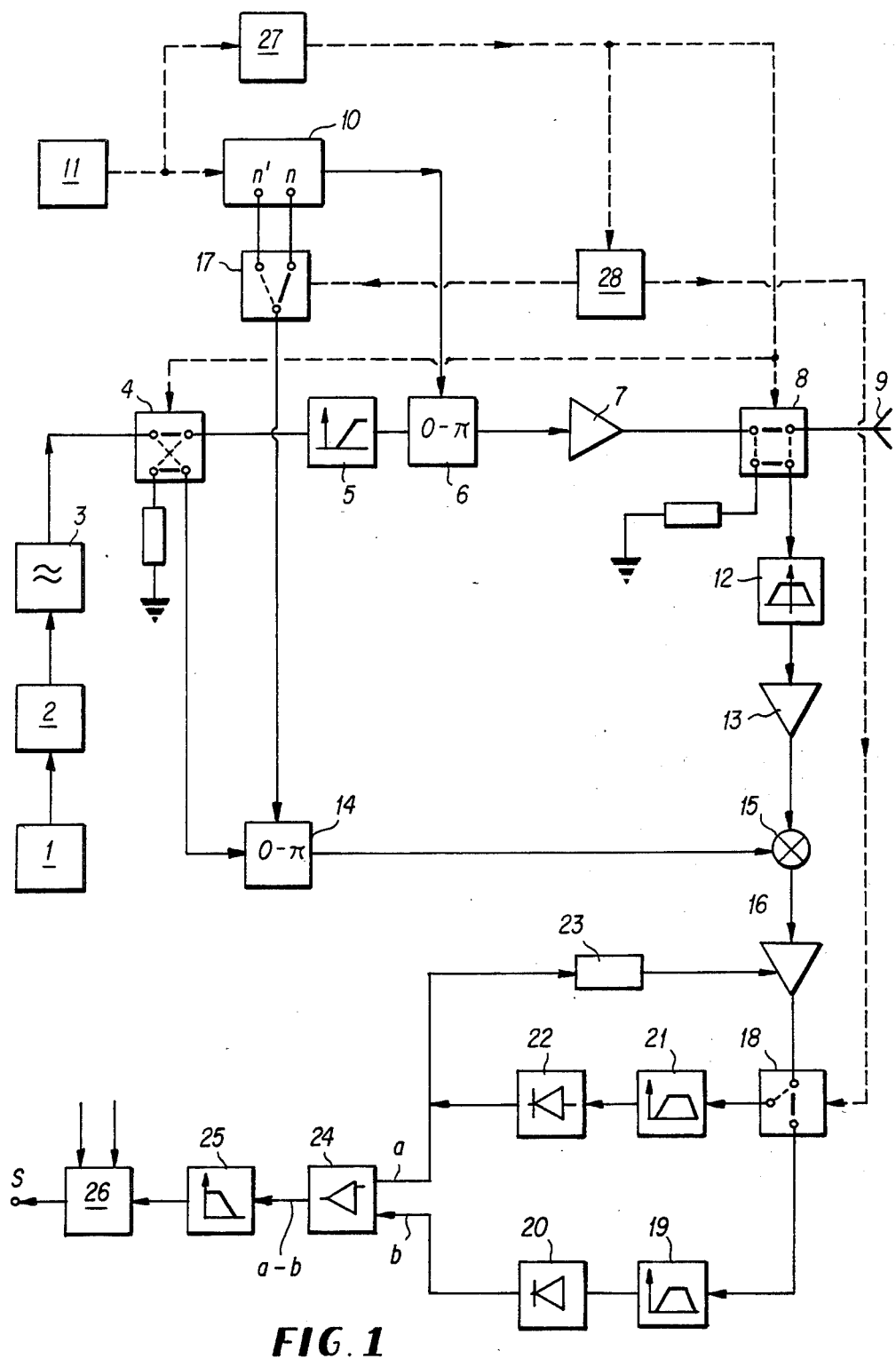
FIG. 1 shows a block diagram of a radar according to the invention.

In the illustrated radar a carrier signal is generated by a quartz oscillator 1 which is connected to a frequency multiplier 2 and a filter 3. This carrier signal is then passed through a first transmitter-receiver commutator 4. The transmission position of commutator 4 is represented in full lines and the reception position is shown in broken lines. The carrier signal is then passed through a high-pass filter 5 followed by an O-$\pi$ phase modulator 6 and a final amplifier 7. The output of this amplifier 7 is supplied, via a second transmitter receiver commutator 8, to a common antenna 9. The transmission position of the commutator 9 is shown in full lines and the reception position is shown in broken lines.

The transmitted signal is phase modulated by a phase shift of zero or $\pi$ (180°) in the modulator 6 in accordance with a pseudorandom sequence output from a loop shift register 10 which is controlled by a clock including an oscillator 11 of adjustable frequency. The pseudorandom sequence is produced at a control frequency which is the frequency of the oscillator 11.

When the commutators 4 and 8 are in their respective reception positions, the return signal reflected from the target is received by the antenna 9 and is passed via a bandpass filter 12, the passband of which is centred on the carrier frequency, to a low-noise amplifier 13. Furthermore, in this reception phase, the carrier signal is passed via the commutator 4 to a second O-$\pi$ phase modulator 14 in which it is phase modulated according to same pseudo-random sequence which was applied to transmitted signal, but delayed, with respect to the transmitted signal, by a time interval corresponding to the duration of a whole number n of bits of the pseudorandom sequence. If t is the duration of a single bit of the pseudorandom sequence, then n is chosen such that n.t is equal to the time taken by the transmitted signal in travelling to and returning from the target when the radar is at the predetermined distance from the target which is to be sensed. A correlator includes a multiplier 15 which ensures the corrolation of the reception signal which receives and multiplies the signal from the amplifier 13 and the signal output from the modulator 14. This multiplier 15 therefore receives, from the amplifier 13, the returned carrier frequency signal which is Doppler shifted because of the relative velocity of the target and the radar, and also phase modulated by the pseudorandom sequence and, from the modulator 14, the carrier frequency signal modulated by the delayed pseudorandom sequence, and produces an output signal at the Doppler frequency. This low frequency output signal has a low amplitude, except when the fixed delay n.t corresponds precisely to the actual time taken by the transmitted signal to travel from and to return to the antenna after reflection from the target, that is when the pseudorandom sequences of the two input signals to the multiplier are in phase. The correlation signal output from the mulitiplier 15 is passed through an amplifier 16 followed by a band-pass filter having a passband corresponding to the expected range of the Doppler frequency.

Such a radar as described up to this point is well known to the man skilled in the art. When such a device is travelling through a severely electromagnetically disturbed region where, for example, it is subject to jamming, parasitic signals of high amplitude are liable to appear at the output of the multiplier 15. When the radar is being used to control the operation of a fuse of an explosive military weapon, it will be appreciated that under the action of such jamming, the explosion can be initiated inopportunely at an altitude above the target substantially in excess of the desired altitude.

In the illustrated embodiment of the invention, a third commutator 17 enables the delayed transmitted signal input to the correlator 15 to have a selected delay which is alternately n.t and n'.t, where n' is a number of bits less than n. In synchronism with this commutator 17, a fourth commutator 18 enables, when the delay is n.t, the output signal from the amplifier 16 to be passed directly to a bandpass filter 19 followed by a detector 20 to produce a signal b and when the delay is n'.t the amplifier output to be passed to a bandpass filter 21 followed by a detector 22 to produce a signal a. In the latter case, when the delay is n'.t, the detector 22 is connected in a feedback loop containing an automatic gain control circuit 23 to the input of amplifier 16. The choice of the passbands of the filters 19, 21 enables the alternating frequency introduced by the commutator 18 to be blocked.

The positions of the commutators 17 and 18 are represented in full lines for the n bits delay and in broken lines for the n' bits delay.

A differencing circuit 24 has two inputs to which the signals a and b, respectively output from the detectors 22 and 20, are fed. The difference (a-b) produced by the circuit 24 is fed through a low pass filter 25 to a comparator 26 capable of comparing the difference signal (a-b) with two thresholds of different levels.

Figure 2:
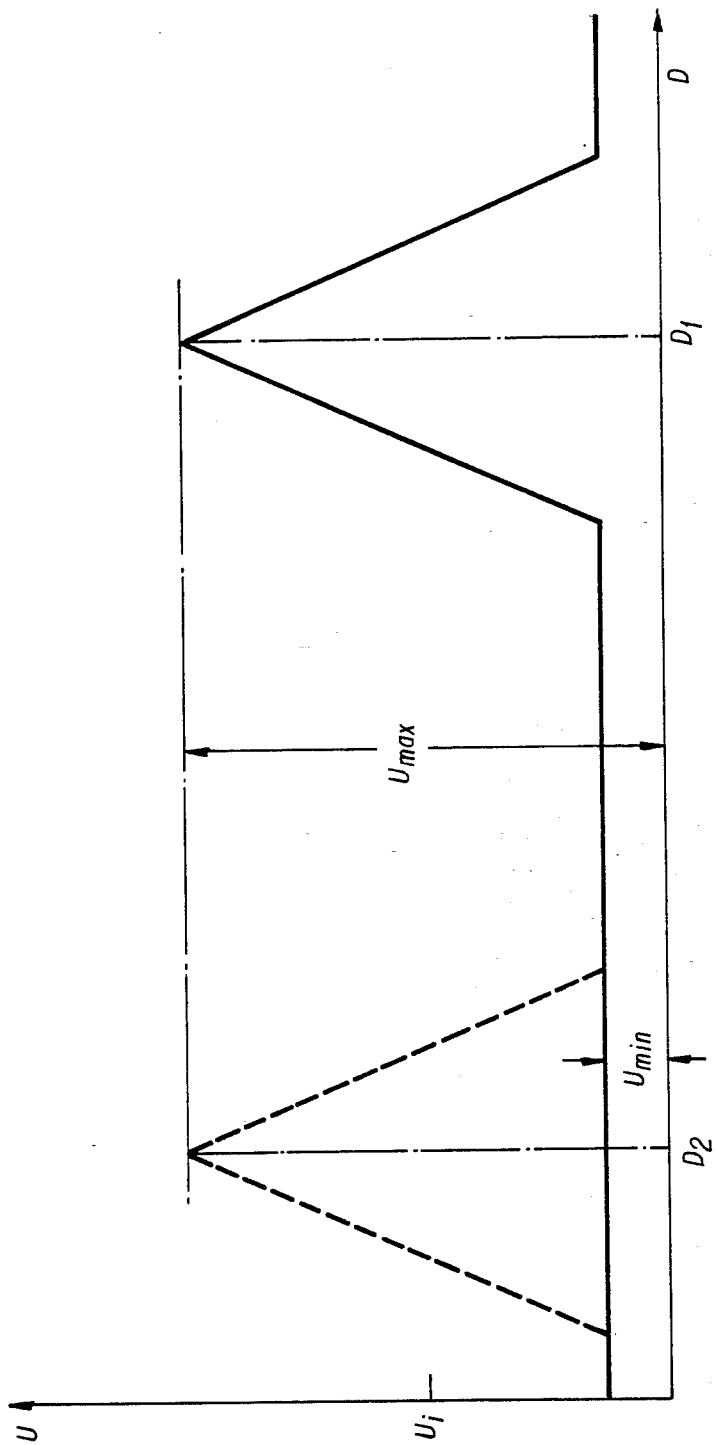
FIG. 2 shows in graph form the voltage U of the correlation signal as a function of the distance D of the radar from the target.

In a proximity radar of known type, the correlation function is illustrated in FIG. 2 on a graph of the correlating signal voltage U against the distance between the radar and the target. This voltage is generally equal to U min except when the delay n.t is approximately equal to the actual time taken by the transmitted signal to travel to and be returned from the target, that is to travel twice the predetermined distance $D_1$ where the delay n.t is precisely equal to this travel time, the voltage is equal to U max.

The presently described radar is intended to be immune to disturbances which will follow from the appearance of an intermediate voltage Ui at the correlator output which would otherwise cause firing at the threshold level of the comparator 26. When the delay introduced into the delayed transmitted signal fed to the correlator is n'.t, U max of the correlation voltage will be produced when the radar is at a distance $D_2$ from the target, where $D_2$ is less than $D_1$. Therefore, if a correlation signal of amplitude Ui appears when the delay is n'.t, it must necessarily be a parasitic signal, the influence of which will be removed by the automatic gain control signal from circuit 23 which will disable the amplifier 16. Thus, this signal will not be taken into account in the comparison stage, during the following correlation with the signal delay of n.t.

Alternatively, if the signal amplitude Ui appears when the delay is n.t and disappears when the delay is n'.t, it must relate to a useful signal corresponding to the distance $D_1$ and it is taken into consideration in the comparison stage since, in this case, the automatic gain control 23 will not come into operation in order to disable the amplifier 16. In this way, it is possible to separate parasitic signals from useful signals.

Furthermore, if the distance $D_1$ is crossed or established precisely at the instant when the radar is operating under the effect of jamming, that is to say an instant where the amplifier 16 is disabled by the automatic gain control, the distance $D_2$ corresponding to the delay n'.t is selected to be sufficiently smaller than $D_1$, so that the radar carrier will have departed from the zone of influence of the jamming when $D_2$ is reached. In particular, when the radar is used to operate a proximity fuse associated with an explosive military weapon the distance $D_1$ corresponds to the normal altitude for explosion, whilst the distance $D_2$ corresponds to a substantially lower altitude at which the auto-destruction of the projectile is effected. In practice, if the radar has departed from the zone of influence of the jamming, only a weak signal will appear at the output of the detector 20 whilst, at the altitude $D_2$, a substantial signal will appear at the output of the detector 22. The differencing circuit 24 therefore delivers an output signal of different sign from the preceding one and this may be used for detecting the passage of the radar through the distance $D_2$. This explains the reason why the comparator 26 has two reference thresholds corresponding to a common absolute value, but of different signs.

The control of the various commutators, 4 and 8 which control the transmission and reception phases and 17 and 18 which control the selection of the time delay and the bringing into operation of the automatic gain control circuit 23, must be effected in synchronism at a frequency which is a sub-multiple of the control frequency of the clock of the oscillator 11 which controls the shift register generating the pseudorandom sequence.

These submultiple frequencies are respectively obtained by frequency divider 27 and 28.

What is claimed is:

1. A proximity radar for detecting when the radar is at a predetermined distance from a target, said radar including
   means for transmitting towards the target a signal phase modulated in accordance with a pseudorandom sequence of logic bits produced at a control frequency, means for receiving the transmitted signal after reflection from said target,
   time delay means for producing an output of a signal corresponding to the transmitted signal which is delayed by a selected time interval,
   means for correlating the received signal with the output signal of the time delay means,
   an amplifier for amplifying the output of said correlating means,
   means for alternately setting said selected time interval to times corresponding to the duration of n and n' bits of said pseudorandom sequence, where n' is less than n and the duration of n bits corresponds to the time taken for the signal to travel twice said predetermined distance, and
   an automatic gain control circuit for controlling said amplifier when said time interval corresponds to n' bits, said automatic gain control device being inoperative when said time interval corresponds to n bits.

2. A proximity radar according to claim 1, further including commutator means for controlling the transmitting and receiving means, said commutator means operating at a frequency which is sub-multiple of said control frequency.

3. A proximity radar according to claim 1, further including commutator means for controlling the selection of the time interval introduced by said time delay means, and the operation of said automatic gain control circuit said commutator means operating at a frequency which is a sub-multiple of said control.

4. A proximity radar according to claim 1, further including a bandpass filter, a detector and a differencing circuit having two inputs, the output of the correlation means produced with said time intervals corresponding to n and n' bits being each fed to a respective input of said differencing circuit via the bandpass filter and the detector.

5. A proximity radar according to claim 4, further including a low pass filter connected to the output of the differencing circuit, and a comparator having two threshold inputs and an input connected to the output of said low pass filter.

6. A proximity radar according to claim 5, in which the two threshold inputs of said comparator are connected to voltages of opposite phases.

7. A proximity radar for detecting when the radar is at a predetermined distance from a target, said radar including means for transmitting towards the target a signal phase modulated in accordance with a pseudorandom sequence of logic bits produced at a control frequency, means for receiving the transmitted signal after reflection from said target, time delay means for producing an output of a signal corresponding to the transmitted signal which is delayed by a selected time interval, means for correlating the received signal with the output signal of the time delay means, an amplifier for amplifying the output of said correlating means, means for alternately setting said selected time interval to times corresponding to the duration of n and n' bits of said pseudorandom sequence, where n' is less than n and the duration of n bits corresponds to the time taken for the signal to travel twice said predetermined distance, an automatic gain control circuit for controlling said amplifier when said time interval corresponds to n' bits, said automatic gain control device being inoperative when said time interval corresponds to n bits; and commutator means for controlling the section of the time interval introduced by said time delay means, and the operation of said automatic gain control circuit said commutator means operating at a frequency which is a sub-multiple of said control.

* * * * *